Feb. 3, 1953 — J. D. WICKS — 2,627,350
FILTER CARTRIDGE
Filed Jan. 12, 1949 — 2 SHEETS—SHEET 1
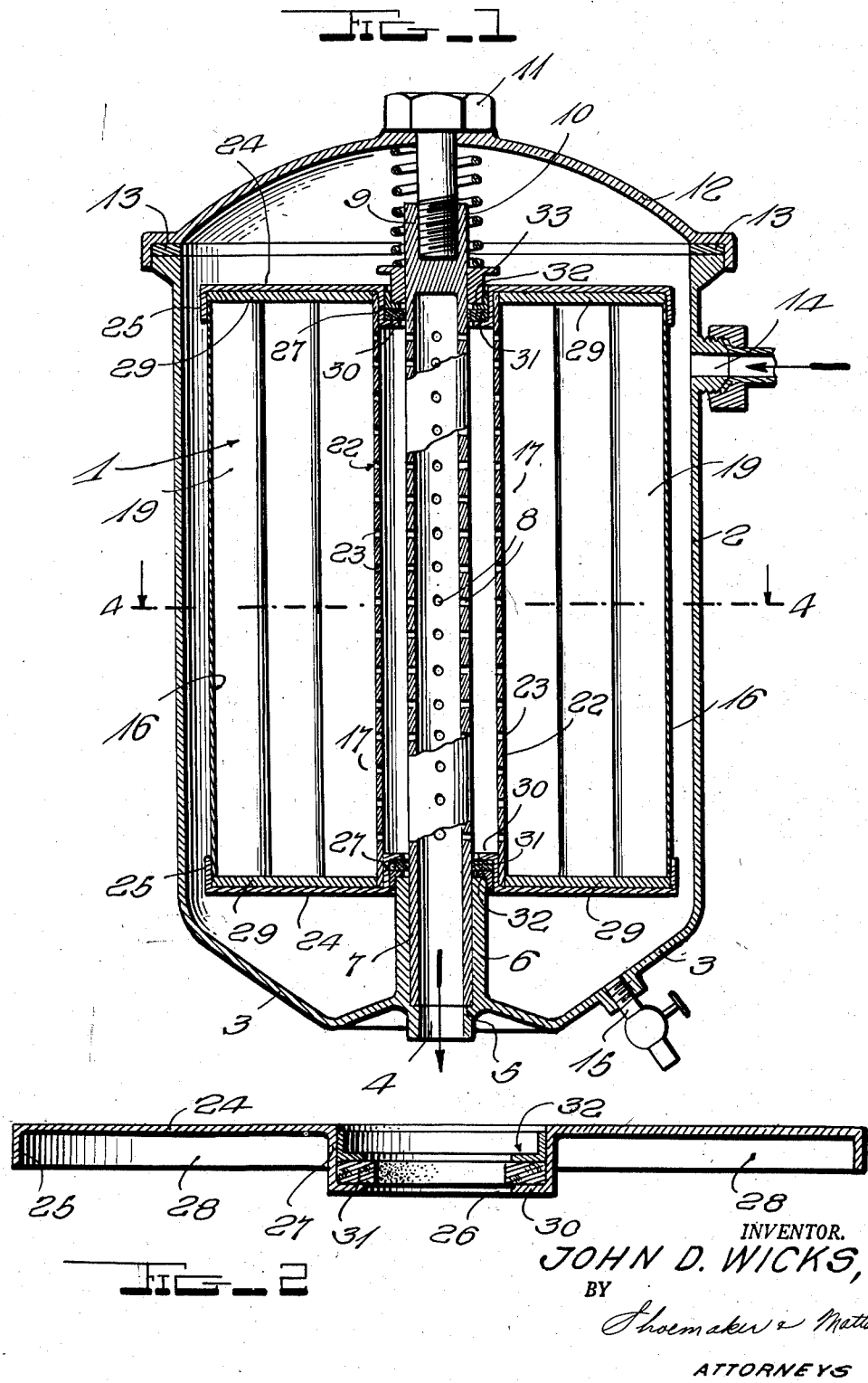
INVENTOR.
JOHN D. WICKS,
BY
Shoemaker & Mattare
ATTORNEYS Feb. 3, 1953 — J. D. WICKS — 2,627,350
FILTER CARTRIDGE
Filed Jan. 12, 1949 — 2 SHEETS—SHEET 2
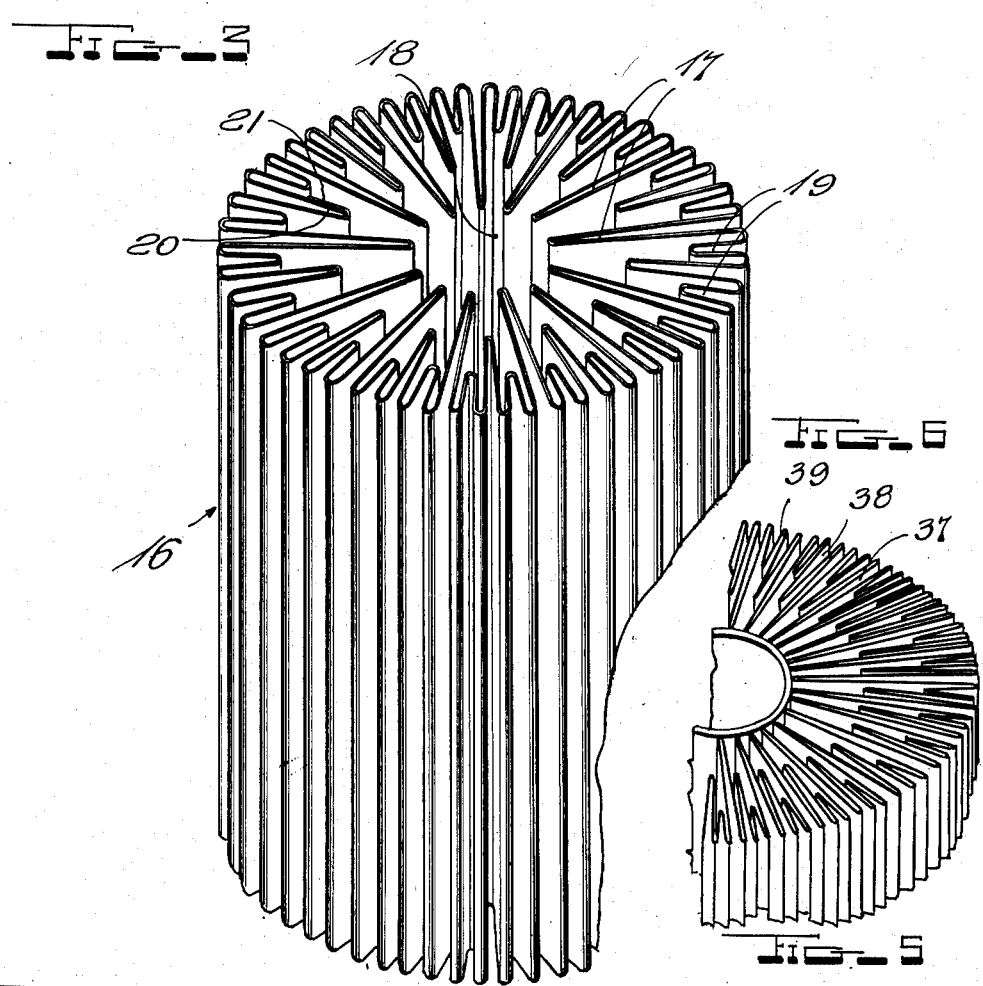
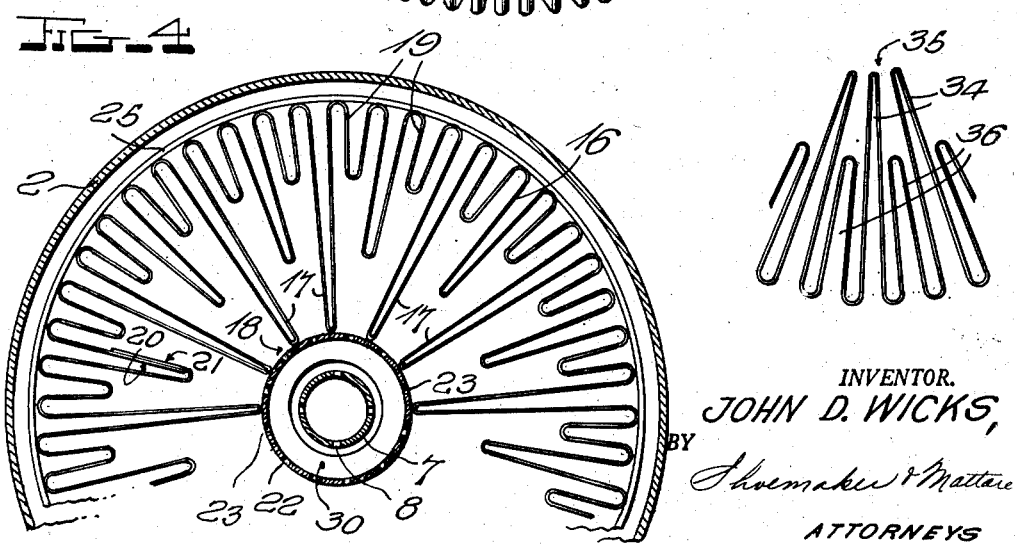
INVENTOR.
JOHN D. WICKS,
BY Shoemaker & Mattare
ATTORNEYS Patented Feb. 3, 1953

2,627,350

UNITED STATES PATENT OFFICE 2,627,350

FILTER CARTRIDGE

John Doane Wicks, Gastonia, N. C., assignor to Wix Accessories Corporation, Gastonia, N. C., a corporation of North Carolina Application January 12, 1949, Serial No. 70,479

5 Claims. (Cl. 210—169)

This invention relates to an improved filter cartridge or unit primarily adapted for use in connection with lubricating systems of internal combustion engines but susceptible of other uses as in connection with other types of lubricating systems and in the filtering of fuel oil. More particularly, the invention has to do with an improved filter unit of the type having a pleated or fluted filter member of general cylindrical form constructed from a strip of paper and having infolds radiating from a central perforated tube or core member associated therewith, the unit also including discs fitting against the ends thereof to seal the same against the flow of liquid thereinto, and also sealing means for the ends of the perforated core member. In the use of such units, the liquid to be filtered is controlled to flow from the outside of the cartridge through the filter member and then through the holes in the center tube or core member and from there out through the outlet pipe of the usual casing in which the filter unit is installed, or the liquid may be controlled to flow from the interior of the central perforated core member laterally through the filter member to an outlet in the outer casing.

The ordinary pleated or fluted type of filter unit referred to has serious drawbacks and limitations. Since the infolds of the filter member are arranged radially, the spacing between the infolds at the periphery is very much greater than at the core. For this reason, the usual radial type of filter member constructed of semi-rigid paper is severely restricted in its outside diameter because of buckling of the outer portions of the infolds or pleats, which if the outside diameter becomes too great, receive little or no support from adjacent folds.

An object of the present invention is to provide an improved filter member of the general type referred to, formed from a strip of semi-rigid paper that will be self-sustaining both axially and radially except for the center core member, that will permit the use of a filter member with radially extending infolds of relatively large diameter with a core of relatively small diameter without reduction of structural strength, and whereby an efficient filter member of simple, strong, economical construction is provided.

Another object of the invention is to provide an improved filter unit of the character referred to which can be readily installed and removed from the filter.

Still further objects of the invention are to provide improved means for securing the end discs to the pleated filter member to seal the ends thereof, and to provide improved means on the filter unit for sealing the ends of the central core member.

A particularly important novel feature of the invention resides in the special construction of filter member formed from a strip of semi-rigid paper having main infolds extending from end to end thereof radially inwardly from its periphery to the central longitudinal core receiving passage thereof, and with auxiliary outer longitudinal infolds intermediate the outer portions of the main infolds, the outer auxiliary intermediate infolds being of the same length as the main infolds but of less width. The outside narrower auxiliary infolds are arranged close to each other and close to the main infolds in the outer spaces between the same, and as will be understood, by this special arrangement buckling of any particular infolds will be resisted by closely adjacent infolds at either side thereof, the narrower intermediate infolds providing additional structural strength where most needed along the outermost portions of the main infolds, the resulting structure being self-sustaining both axially and radially except for the central core member.

Another important novel feature of the invention resides in the special means provided for fastening the sealing discs to the pleated filtering member whereby the discs are firmly secured to the ends of the filter member and efficient seals provided therefor.

Another novel characteristic of the invention lies in the special means of simple construction constituting a part of or carried by the filtering unit and which provides efficient seals for the ends of the center core member and facilitates quick and easy assembly and removal of the unit from the filter.

The invention, with other objects, advantages and novel features thereof and the particular construction, combination and arrangement of parts comprising the same will be understood from the following detailed description when considered in connection with the accompanying drawings forming part hereof and illustrating two embodiments of the invention.

In the drawings:

Fig. 1 is a central longitudinal section of an oil filter equipped with a filtering cartridge constructed in accordance with the present invention;

Fig. 2 is a detail transverse section of one of the end caps for the filter unit;

Fig. 3 is a detail perspective view of the filter member shown in Fig. 1 of the drawings;

Fig. 4 is a fragmentary transverse section taken on the line 4—4 of Fig. 1;

Fig. 5 is a detail fragmentary top plan view of a modified form of filtering member.

Fig. 6 is a detail fragmentary perspective view of another modified form of filtering member.

While three preferred embodiments of the invention are illustrated in the drawings, it will of course be understood that minor changes and modifications may be made in the constructions shown, and the invention may be embodied in other forms as will appeal to those skilled in the art and falling within the scope of the appended claims without departing from the spirit of the invention.

Referring to a detailed description of the particular embodiment of the invention illustrated in Figs. 1 to 4 of the drawings, 1 designates generally the filter cartridge or unit, the same being shown installed within a filter casing 2 of general cylindrical form having an inwardly tapering bottom 3 that is provided with a centrally located outlet 4. Extending upwardly within the casing from an annular shoulder 5 at the upper end of the outlet 4 is a collar 6, in which is fitted the lower end of a hollow central post 7 having perforations 8 therein. The central post 7 has an interiorly threaded portion 9 at its upper end to receive the threaded portion 10 of a cap screw 11, which serves to detachably secure a dome-like cover 12 on the upper end of the casing. 13 designates a sealing gasket between the cover and the upper end of the casing 2. The casing is provided with an oil inlet 14 in the upper part thereof and the bottom of the casing is shown provided with a valve controlled drain pipe 15.

The filter cartridge or unit 1 includes a filter member formed from a strip 16 of semi-rigid filter paper folded to general cylindrical form with a plurality of main longitudinal infolds 17 equally spaced thereabout extending from end to end thereof radially inwardly from its periphery and terminating at a central part thereof leaving a central longitudinal space or passage 18, and with a plurality of outside auxiliary longitudinal infolds 19 of less width than the main infolds 17 located close together in the spaces between outer portions of the main infolds. As shown in Figs. 3 and 4 of the drawings, the auxiliary outside infolds 19 are equally spaced from each other and from the main infolds. In the particular construction shown, there are three auxiliary outside infolds 19 between each of the main infolds 17, the auxiliary infolds 19 which are located farthest away from the main infolds 17 being wider than the other intermediate infolds. In the construction of the filter member, after the strip has been folded, end portions 20, 21 of the paper strip 16 are overlapped and secured to each other in any suitable way as by stitching or stapling (not shown) supplemented by suitable adhesive material. The filter member is constructed of any suitable filter paper, either non-impregnated paper or impregnated paper as for example resin impregnated filter paper. Disposed within the central longitudinal space or passage 18 of the filter member in supporting engagement with the inner edge portions of the main infolds 17 thereof is a perforated tubular core member 22. The tubular core member 22, which is preferably formed of metal, is open at its ends. 23 designates the perforations in the wall of the tubular core member spaced circumferentially and axially about and along the same.

On each end of the filter member is a metal cap 24. Each end cap 24 has an outer peripheral inturned flange 25. Each of the end caps also has a central opening 26 with an annular inturned flange 27 bordering the opening, the flanges of the cap with the body part thereof forming an annular chamber 28. In the annular chamber 28 of each of the end caps 24 is placed a sealing disc 29, and the ends of the filtering member and the tubular core member 22 are disposed within the annular chamber, the ends of the filter member fitting against the sealing discs. The sealing discs 29 are made of soft paper such as Kimberly-Clark Kimpak that has enough resilience to allow the ends of the pleated filter member 16 to sink into the discs. The sealing discs are saturated with a thermo-setting resin in the uncured or "B" stage. With the ends of the filter member 16 held tightly against the sealing discs 29 in the end caps 24, heat is applied to the sealing discs. After the heat treatment, the disc will satisfactorily bond itself both to the body part of the end caps 24 and to the ends of the paper infolds 17, 19 of the filter member 16, these parts with the end portions of the central core member 22 being firmly secured together and an efficient seal provided for the ends of the filter member 16 to prevent the entrance of liquid into the same.

The inner flange 27 of each of the end caps 24 has an annular inturned portion 30 adapted to hold a gasket 31 of cork or other suitable material to seal the adjacent end of the tubular perforated core member 22, the end caps 24 in addition to carrying the sealing discs 29 for the ends of the filter member 16 also serving as supporting means for the gaskets. The gaskets 31 are held against the annular inturned portions 30 of the flanges 27 of the end caps by retaining rings 32 that fit tightly into the interior of the inner annular flanges 27 and against the gaskets 31, the latter being adapted to snugly embrace the hollow center post 7 as shown in Fig. 1 of the drawings. The filter member 16 is installed within the filter casing 2 simply by aligning the openings of the gaskets 31 with the upper end of the central post 7 and then slipping the unit down onto the center post until the retaining ring 32 at the lower end of the filter unit engages the upper end of the collar 6, the latter serving as an annular seat for the lower end of the filter unit. A spring pressed collar 33 extends into the interior of the flange 27 of the end cap at the upper end of the filter member and against the retaining ring 32 and holds the same in position against the upper end of the collar 6.

By the special arrangement of parts hereinbefore set forth, an efficient filter member of simple, strong, economical construction is provided. With the outside narrower auxiliary infolds arranged close together in the spaces between the outermost portions of the main infolds and spaced equally from each other and from the main infolds, buckling of any particular infold will be resisted by closely adjacent infolds at either side thereof, the narrower intermediate outer infolds providing additional structural strength where most needed along the outermost portion of the main infolds, the resulting structure being self-sustaining both axially and radially except for the central core member. The construction provides for the use of a filter member having any desired ratio of outside diameter and central core diameter without reduction in structural strength so that the maximum available filtering surface within a given outside diameter will be utilized.

The modified construction of filter member illustrated in Fig. 5 of the drawings, is the same as that hereinbefore described and illustrated in Figs. 1 to 4 except that there is only a single auxiliary outer intermediate infold between each of the main infolds. In this view, 34 designates the main infolds extending from the periphery of the filter member to the central longitudinal passage 35, and 36 designates the narrower auxiliary intermediate infolds.

It will be understood that, in actual practice, the infolds of the filter unit are disposed in close proximity to each other in order to lend mutual support. In Figs. 3, 4 and 5, for the sake of clearness, the spaces between the infolds are exaggerated.

The modified construction illustrated in Fig. 6, like the construction hereinbefore described, and illustrated in Figs. 3 and 4, comprises main infolds 37 with auxiliary infolds of less width than the main infolds located close together between outer portions of the main infolds. In Fig. 6, 37 designates the main infolds. The intermediate auxiliary infolds are designated 38 and 39, respectively. In this instance, there is only one of the narrowest infolds 39 between each of the main infolds 37.

What I claim is:

1. A replaceable filter cartridge comprising a stiff vertically disposed perforated center tube, a vertically disposed cylindrical pleated filtering member surrounding said tube and consisting of an elongated web of semirigid filter paper folded to extend back and forth between inner and outer peripheral surfaces of the filtering member and defining pleats extending longitudinally of the filtering member, the folds of the web at the inner surface of the filtering member being disposed in contacting engagement with the tube but unsecured along the length of the tube throughout their length, and a disc at each end of the filtering member permanently adhesively secured to end edges only of the pleats and serving to reinforce and maintain the pleats in their relationship to each other and to the center tube and also serving to provide a fluid tight seal between the end edges of the pleats and the discs.

2. The structure of claim 1 wherein the discs are preformed of thin sheets of non-metallic material before being applied to the ends of the pleated cylindrical filtering member and wherein there is a rigid cap disposed in flat contacting engagement with the outer surface of each disc in covering relation thereto, said cap being formed with a center opening and having a flange about its marginal edge extending across the marginal edge of the disc and overlapping adjoining end portions of the outer side edges of the pleats.

3. The structure of claim 1 wherein the folds in addition to defining the pleats having contact with the perforated tube also define auxiliary pleats disposed between and of less width than the first mentioned pleats and having inner side edges spaced from the perforated tube and their upper and lower end edges adhering to the discs.

4. The structure of claim 1 wherein the folds in addition to defining pleats having contact with the perforated tube also define auxiliary pleats of less width than the first mentioned pleats disposed between the first mentioned pleats with their inner side edges spaced from the perforated tube, the folds in addition to defining the auxiliary pleats also defining other pleats disposed between the auxiliary pleats and the first mentioned pleats and of less width than the auxiliary pleats.

5. The structure of claim 4 wherein all of the pleats are of the same length and wherein all of the pleats have their outer side edges flush with each other and their upper and lower end edges adhering to the discs.

JOHN DOANE WICKS.

REFERENCES CITED

The following references are of record in the file of this patent:

UNITED STATES PATENTS

| Number | Name | Date |
|---|---|---|
| 1,303,438 | Wiehl | May 13, 1919 |
| 1,884,616 | Dooley | Oct. 25, 1932 |
| 2,210,397 | Dreiss | Aug. 6, 1940 |
| 2,218,800 | Williams | Oct. 22, 1940 |
| 2,239,868 | Williams | Apr. 29, 1941 |
| 2,294,262 | Wilkinson | Aug. 25, 1942 |
| 2,337,579 | Walker | Dec. 28, 1943 |
| 2,395,449 | Briggs | Feb. 26, 1946 |
| 2,413,991 | Newman | Jan. 7, 1947 |
| 2,456,292 | Manwaring | Dec. 14, 1948 |
| 2,468,862 | Briggs | May 3, 1949 |
| 2,472,012 | Hanneman | May 31, 1949 |
| 2,512,797 | Harvuot | June 27, 1950 |